United States Patent [19]

Treadwell et al.

[11] 4,222,581
[45] Sep. 16, 1980

[54] APPARATUS AND METHOD FOR MOVING A LARGE OBJECT

[75] Inventors: Walter L. Treadwell, Piedmont; Kenneth F. Dewing, Benicia, both of Calif.

[73] Assignee: Rigging International, Oakland, Calif.

[21] Appl. No.: 894,397

[22] Filed: Apr. 7, 1978

[51] Int. Cl.² ............................................. B60P 1/00
[52] U.S. Cl. ................................. 280/81 R; 91/531; 180/41; 280/6 H
[58] Field of Search .................... 280/81 R, 6 R, 6 H, 280/DIG. 1; 254/86 H, 84; 180/1 R, 22, 9, 140, 141, 11, 41; 91/61, 76; 52/143, 749; 92/526, 531, 515, 38 C, 38 CC; 214/1 H, 1 R; 114/78, 74 T, 75

[56] References Cited

U.S. PATENT DOCUMENTS

| 2,101,837 | 12/1937 | Blanchett | 280/6 H |
| 3,779,399 | 12/1973 | Shigeno | 254/84 |

Primary Examiner—John J. Love
Assistant Examiner—Randall A. Schrecengost
Attorney, Agent, or Firm—Bruce & McCoy

[57] ABSTRACT

The method and apparatus for moving a large object using four crawler transporters disposed in a rectangular or a trapezoidal pattern under the object and which support and move the object with an effective three point suspension.

21 Claims, 14 Drawing Figures

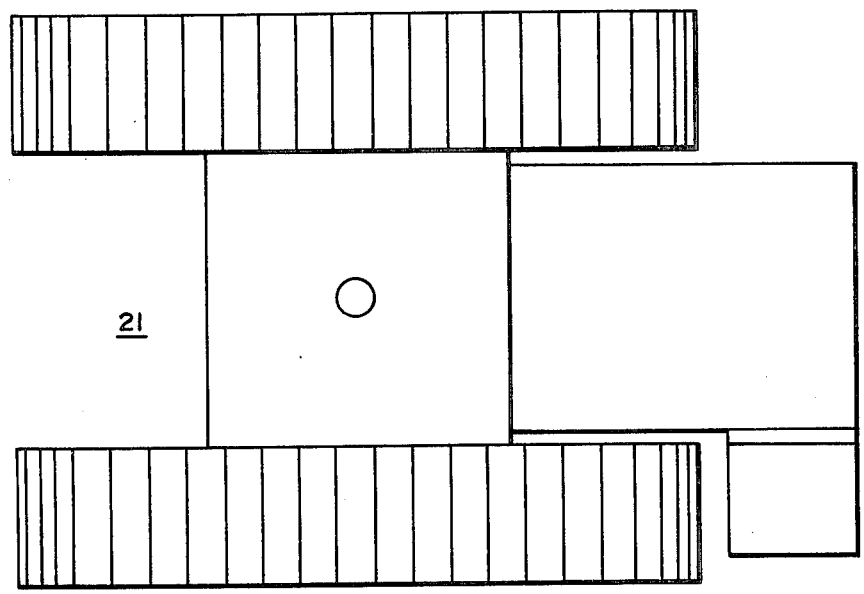
FIG.—1
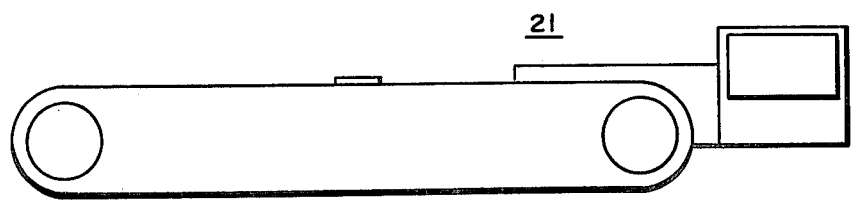
FIG.—2
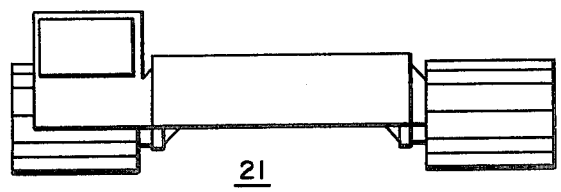
FIG.—3

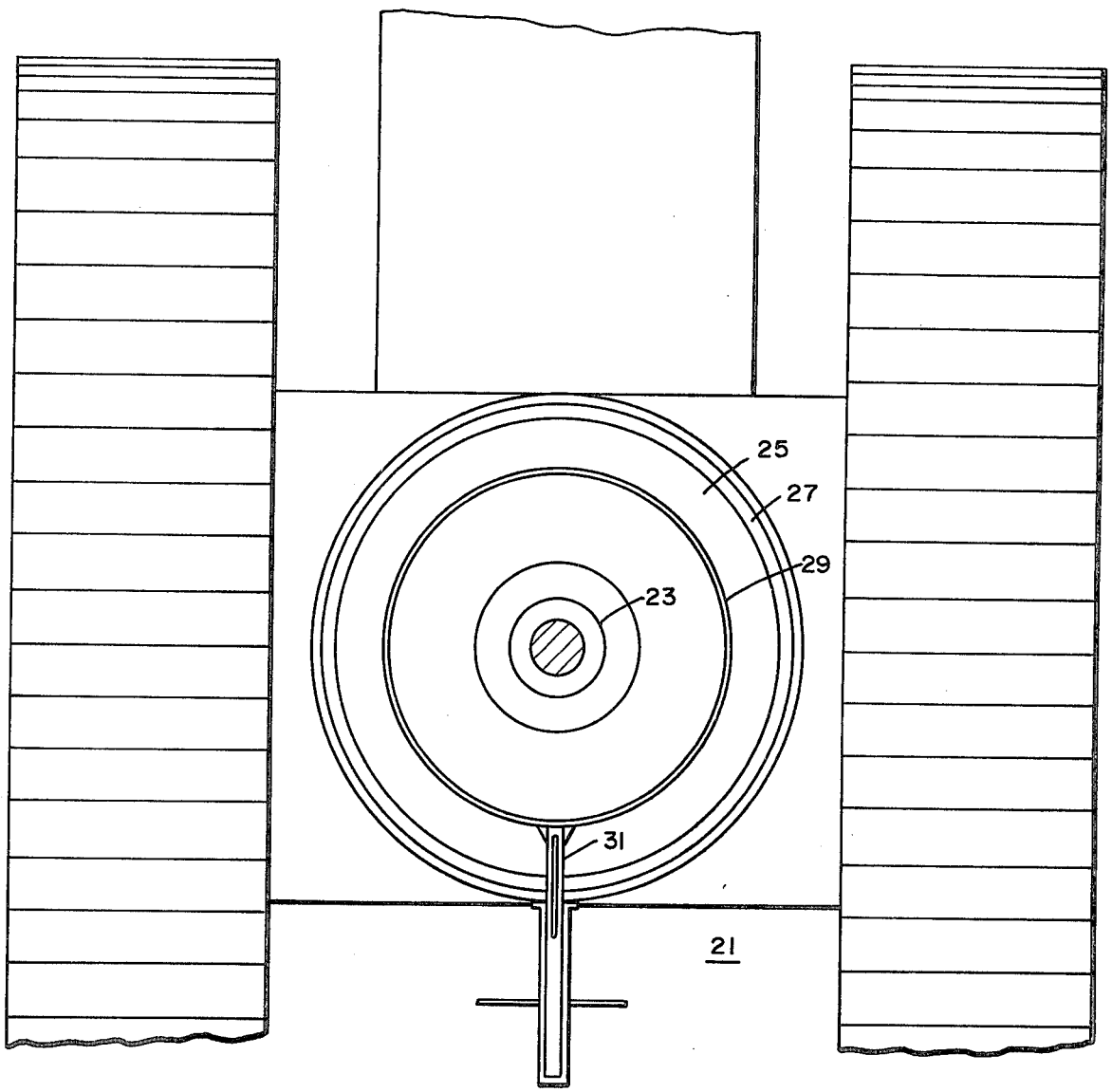
FIG.—4
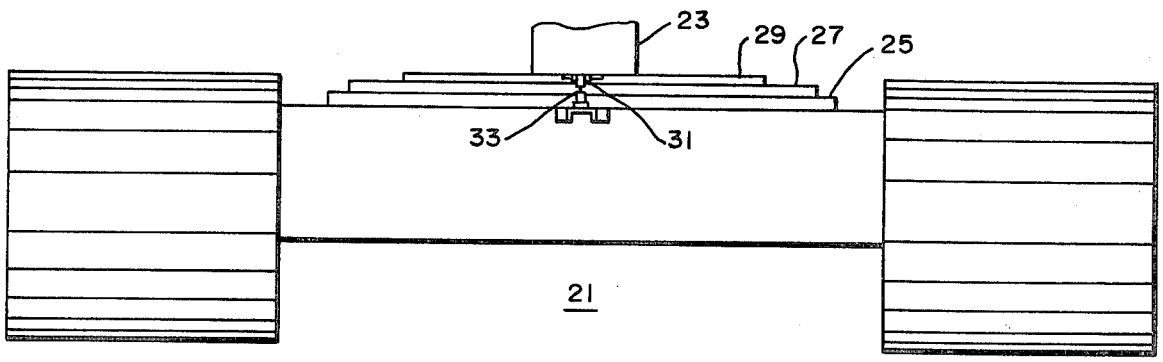
FIG.—5

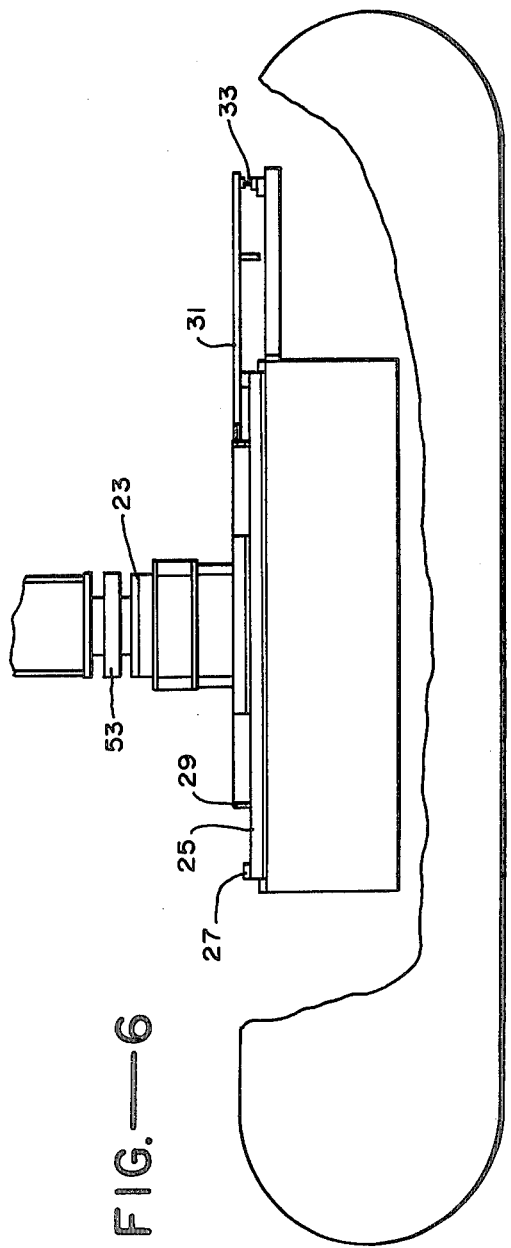
FIG.—6
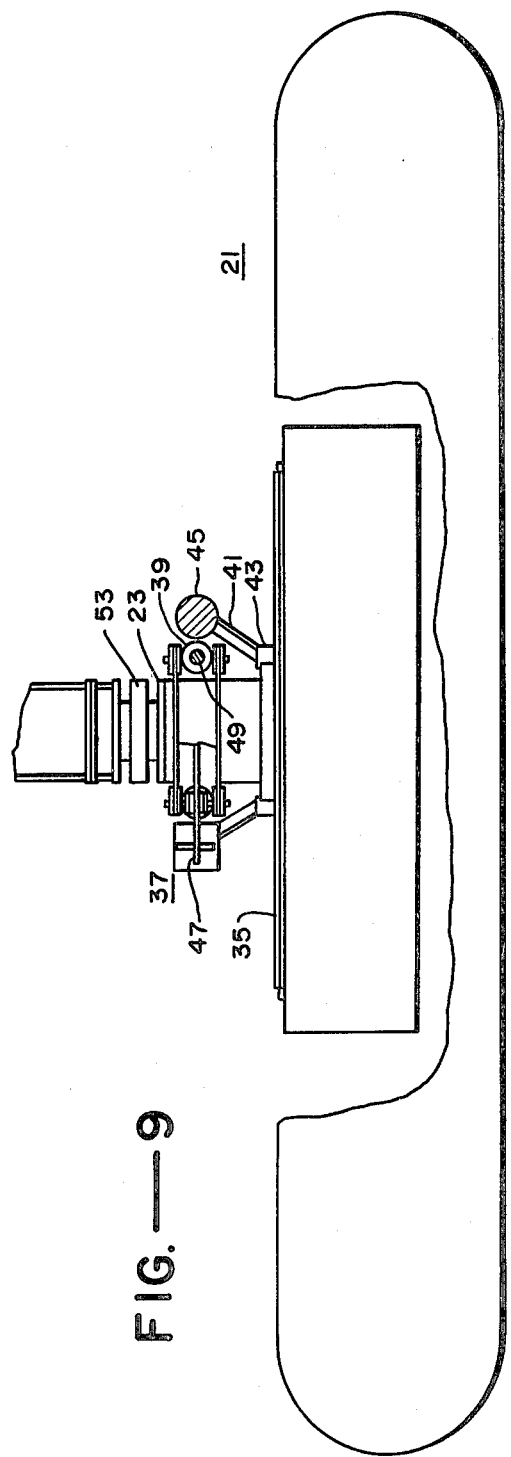
FIG.—9

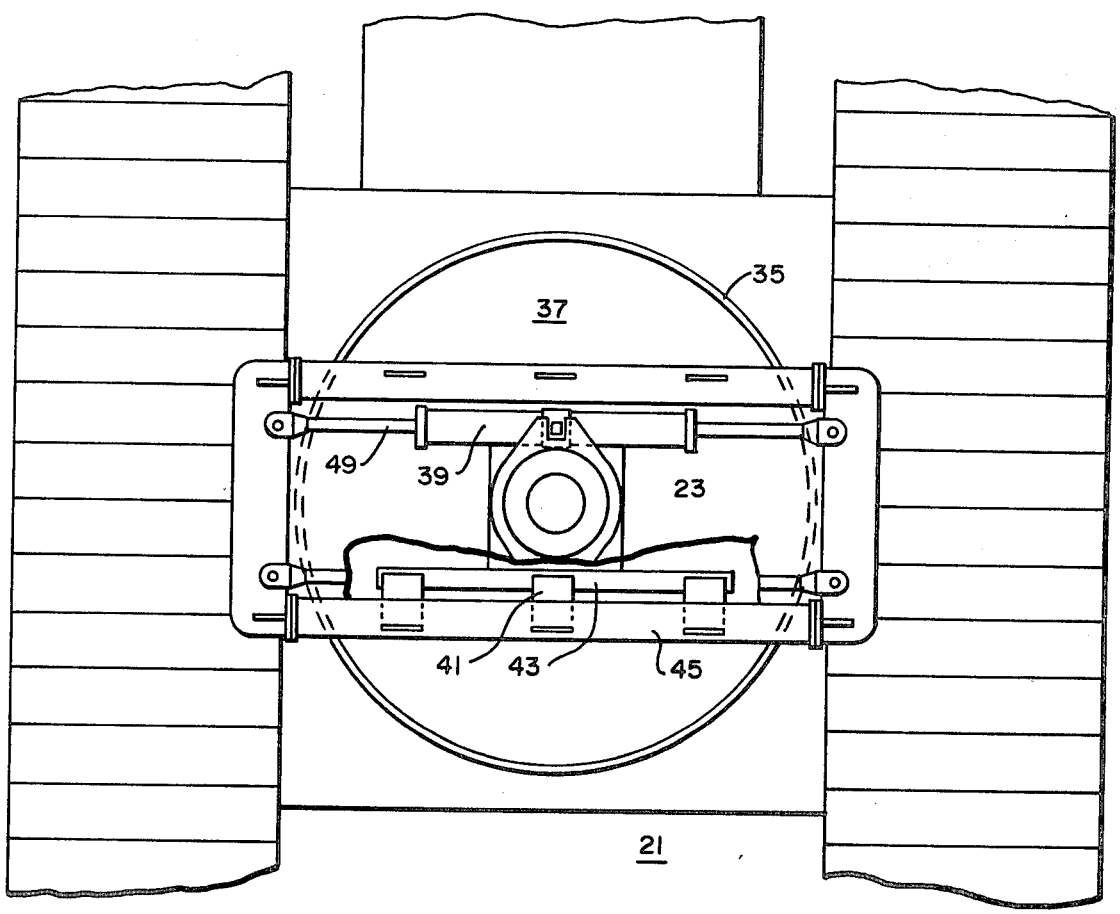
FIG.—7
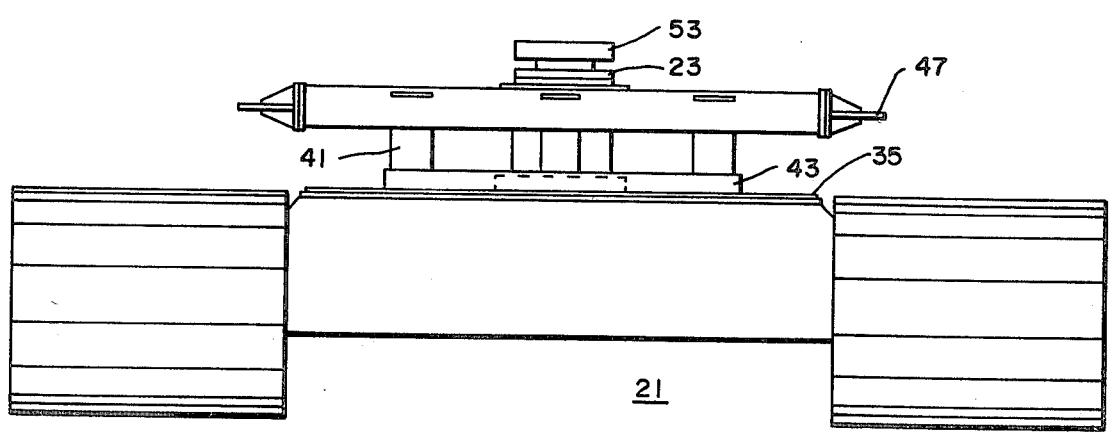
FIG.—8

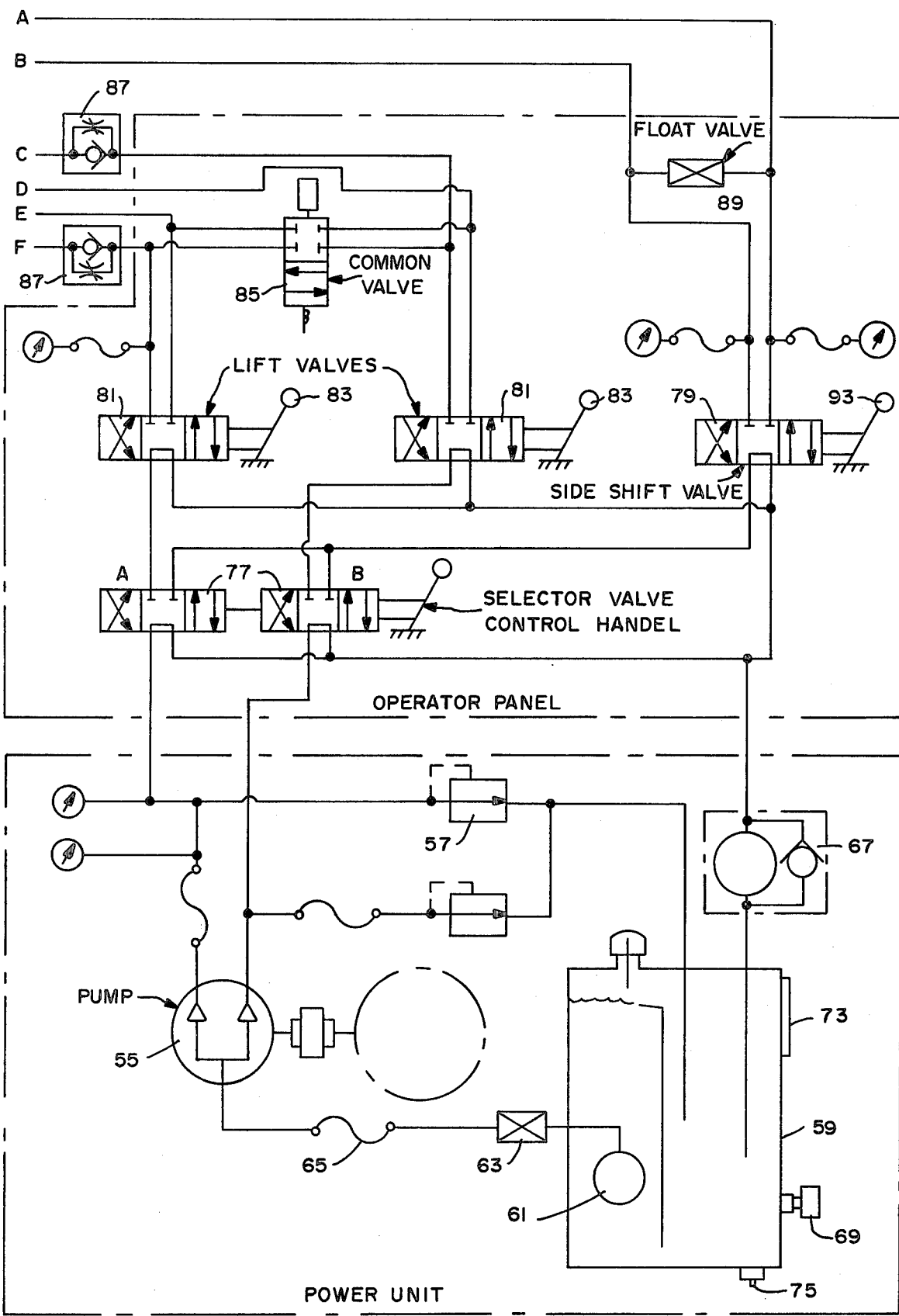
FIG.—10A

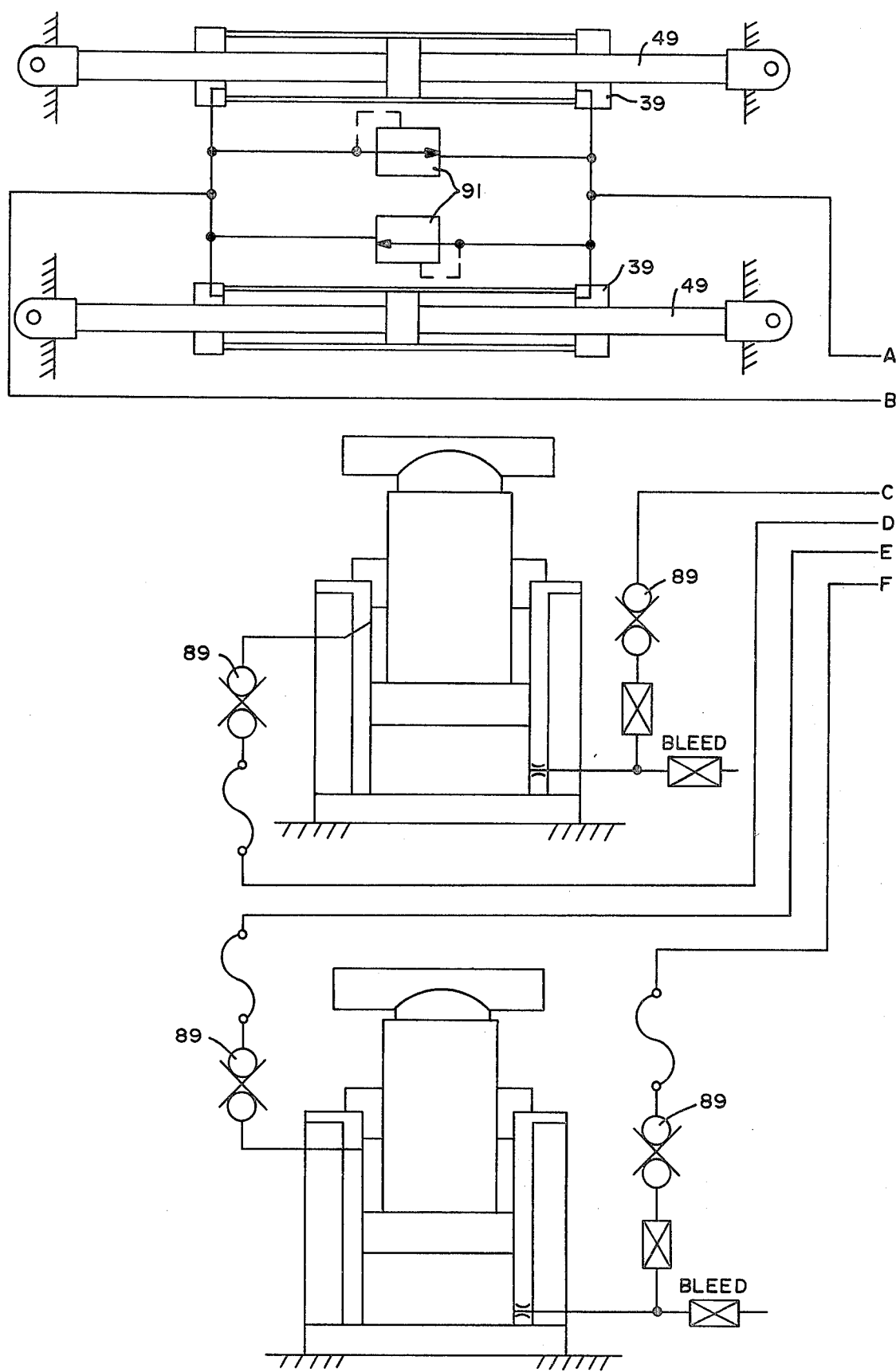
FIG.—10B

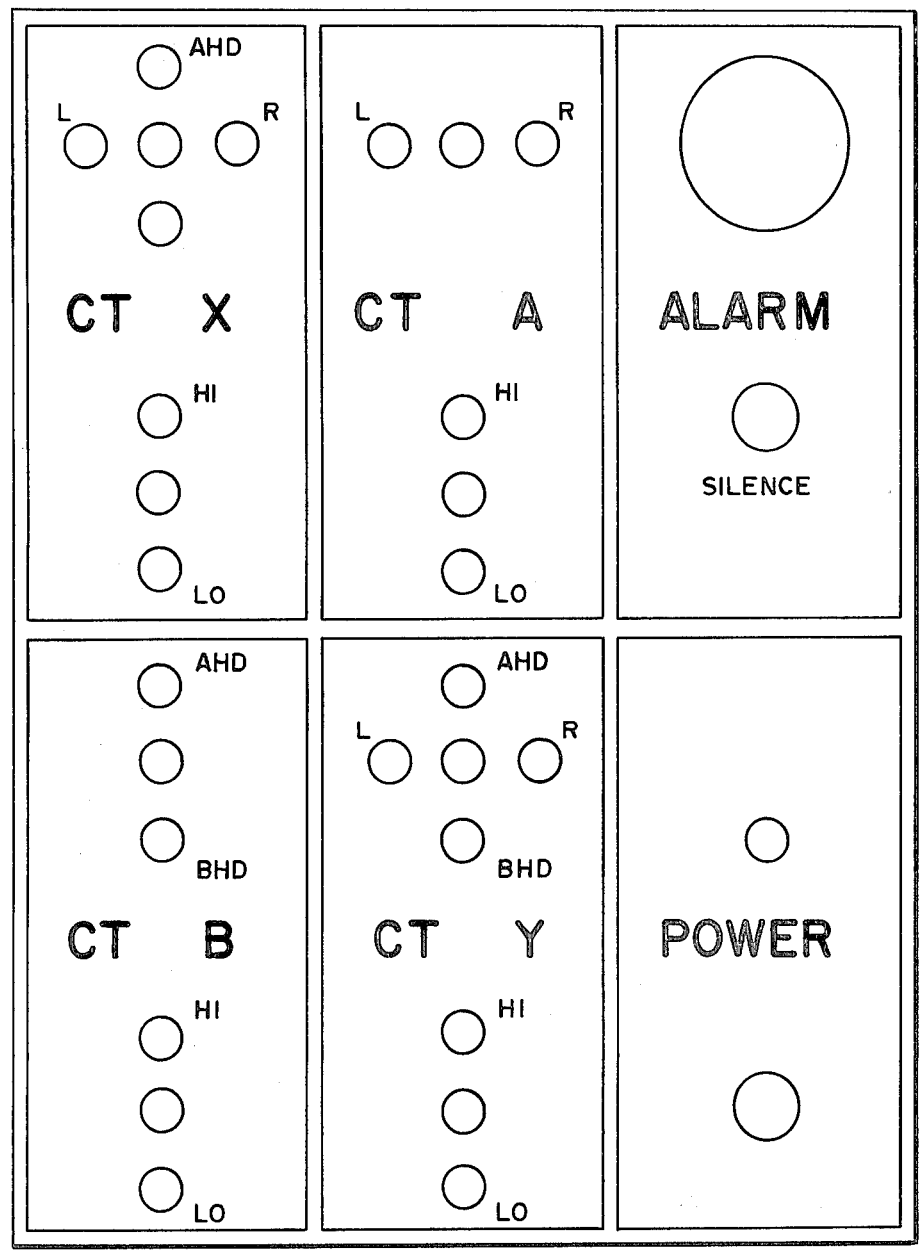
FIG.—12

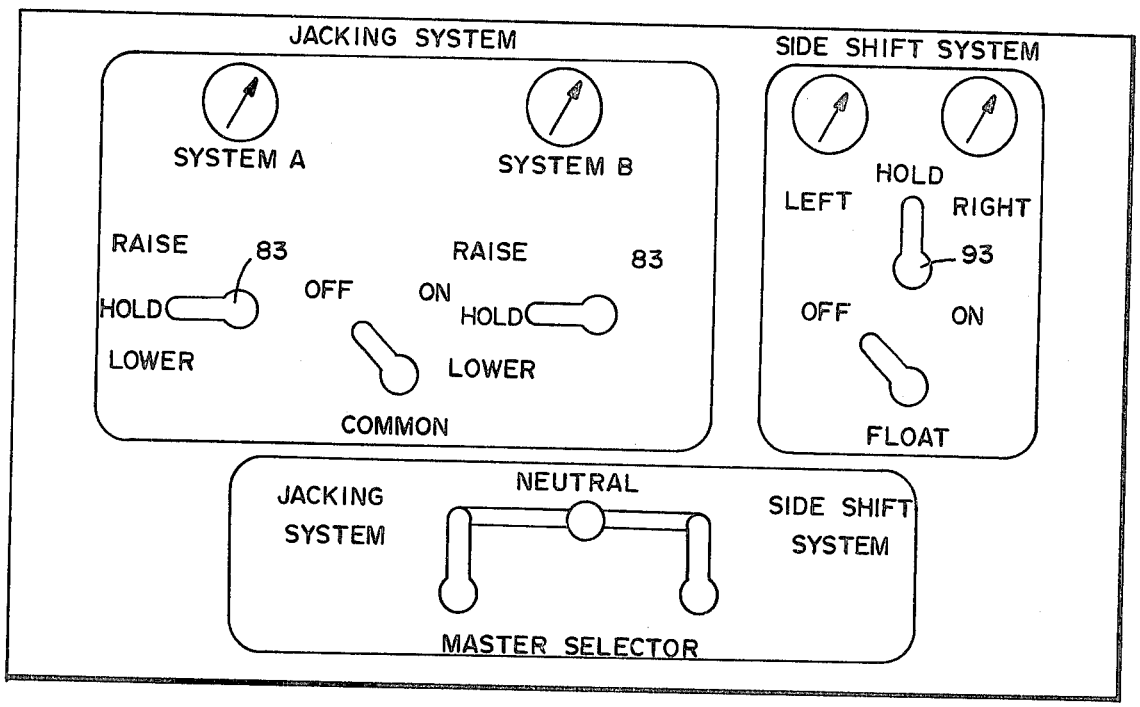
FIG.—11
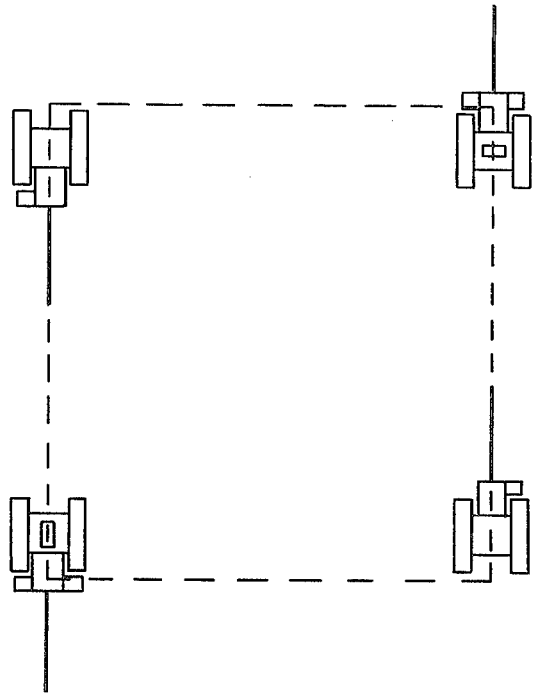
FIG.—13
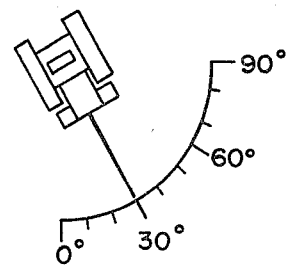
FIG.—14

APPARATUS AND METHOD FOR MOVING A LARGE OBJECT

BACKGROUND OF THE INVENTION

1. Field of the Invention

The present invention relates to a method and apparatus for moving a large object and more particularly to a method and apparatus utilizing four crawler transporters for supporting a very large object at four points under the object with an interconnected hydraulic system which results in three point suspension during transport.

2. Description of the Prior Art

Prior to the present invention, very large objects were moved by placing them on a large trailer or support platform both of which supported the bottom of the object during the move. There are several problems with this arrangement: it requires a very large strong platform, and a means is required for moving the object sideways onto the support platform after the object has been lifted to the proper height. The present invention alleviates both of those problems and permits simply lifting the object then transporting the lifting apparatus thus eliminating the need for a support platform or for the lateral translation of the object onto the platform. The present invention uses the inherent rigidity of the object itself as the support platform.

A further problem with the prior art of moving an object on a platform or trailer is that if the platform tips or warps due to the unevenness of ground over which the object is moved, or for some other reason, then the object on the platform could also tip or become unevenly supported, and the load reactions on the bottom of the object could change and this could have the effect of racking a large structure to a degree which would damage it.

The present invention eliminates the possible racking of the object by supporting it in an effective three point planar suspension uniquely distributed over four support points.

SUMMARY OF THE INVENTION

The present invention includes a method for transporting a large object which comprises selecting four spaced apart lift points on the bottom of the object and then positioning a crawler transporter under each lift point. Hydraulic lift means are provided on each transporter for lifting the object at each of the lift points. A hydraulic interconnection is made between two adjacent hydraulic lift means whereby the hydraulic systems of the two lift means are commoned to equalize the hydraulic pressure between the two so that the lift means are interdependent and effectively operate as a single lift point disposed between the two lift points. The object is then lifted and is transported by operating each of the transporters simultaneously in the same direction in a coordinated manner while the four lift means support the object with an effective three point suspension.

The present invention also constitutes an apparatus for moving a large object which comprises four crawler transporters having hydraulic lift means mounted on the top of each transporter for lifting the object. A sliding mount is disposed on the top of the transporters to permit one of ends of each of the hydraulic lift means to shift and adjust with respect to its transporter. A hydraulic interconnection is provided between at least two of the lift means to permit both lift means to float interdependently under load and to effectively operate as a single lift point disposed between the two lift means,

OBJECTS OF THE INVENTION

It is therefore an important object of the present invention to provide a new and improved method for transporting a very large object which does not rack the structure of the object due to the unevenness of the ground traversed.

It is another object of the present invention to provide a new and improved method for moving a large object by four independent crawler transporters without a supporting platform.

It is a further object to provide a method of moving a large object by an effective three point suspension when the object is supported at four points by the moving means.

It is yet another object of the present invention to provide a method for changing the direction of travel when moving a very large object by means of four independent crawler transporters;

It is yet a further object of the present invention to provide an apparatus for lifting and supporting and transporting a very large object by three point suspension when the object is actually supported at four points;

And it is still another object of the present invention to provide an apparatus for moving a very large object which supports the object at four equally spaced apart points and does not rack the load when traversing uneven ground.

Still other objects of the invention will become apparent when the description of the preferred embodiment thereof is considered in conjunction with the accompanying drawings.

BRIEF DESCRIPTION OF THE DRAWINGS

FIG. 1 is a top plan view of a crawler transporter as used in the present invention;

FIG. 2 is a side view thereof;

FIG. 3 is a front view thereof;

FIG. 4 is a top plan view of the lift jack support platform and apparatus mounted on the smaller 400 short ton crawler transporter;

FIG. 5 is a rear elevation thereof;

FIG. 6 is an end elevation thereof;

FIG. 7 is a top plan view of the lift jack support platform and side shift rams mounted on the larger 500 short ton crawler transporters;

FIG. 8 is a side elevation thereof;

FIG. 9 is a side elevation thereof;

FIG. 10 is a schematic of the hydraulic system of the present invention;

FIG. 11 is a representational drawing of the control panel for the hydraulic system;

FIG. 12 is a top plan view of the warning panel of the present invention; and

FIG. 13 is a top plan view of the four crawler transporters of the present invention supporting a rectangular load.

DESCRIPTION OF THE PREFERRED EMBODIMENT

The apparatus and method of the present invention were developed for the purpose of lifting and transporting very large liquid natural gas tanks. The tanks were fabricated and then installed in a ship at the same plant location. The largest tank to be moved and installed was fabricated from aluminum and was 120 feet square by 75 feet high and weighed approximately 1200 tons. Other than when the tanks were being transported, the tanks were supported on plinths with the tank bottom being five feet above grade. The four corners of the tank were provided with four identical steel lifting brackets which were used when transporting the tank.

THE CRAWLER TRANSPORTERS

Each tank was transported by four crawler transporters 21 (CTs) with one CT being disposed under each corner of the tank. Each CT had a 300 ton lift jack 23 mounted on its horizontal upper deck.

Two different types of CT of two each were used for the moves. A typical configuration of both is shown in FIGS. 1–3. The CTs which are disposed at diagonal corner positions are identical. The track footprint areas of the two different CTs are about the same, and the dead weight each CT is about 80 short tons. The rated capacity of the larger type of CT is 500 short tons (ST) and the capacity of the smaller type of CT is approximately 400 ST. The capacity of both types of CTs is in excess of the 300 ST needed per CT to move the loads described. The 400 ST capacity CTs are approximately 30 feet long and 20 feet wide with each track approximately 5 feet wide by 25 feet long. The larger CTs are approximately 28 feet long and 22 feet wide with each track approximately 5½ feet wide by 22 feet long.

The CTs which are rated at 500 ST have single power units while the smaller CTs of 400 ST capacity have dual power units.

The propulsion system of the CTs is diesel power which drives through a torque converter, clutch, transmission, steering clutch, and final chain sprocket reductions of the track. The steering clutch and brakes are air operated. The ground speeds of the two different types of CTs under a no load condition, in a given gear selection and engine rpm, vary about 10% with the larger capacity CTs having the higher speed. This differential in the low gear range and with the low rpm was not sufficient to cause any problem for the method of moving a large object. The torque converters of the two different CTs act in unison to cushion the torque differentials, and the friction between the CTs and the jack faces supporting the load tied the CTs together under normal operating conditions and would tend to do so for all transports except possibly very light loads.

THE FREE FLOATING LIFT JACKS

The larger CTs having the 500 ST capacity are provided in the preferred embodiment with a circular platform which is a 2½ inch thick steel plate with a ½ inch stainless steel skid plate 25 mounted on top of the CT for supporting a hydraulic jack. The platform is approximately ten feet in diameter. The base of the hydraulic jack sits on the stainless steel skid plate and is designed to slide thereon. Two of the four jacks supporting the load are designed to be free to float in any horizontal direction within a given radius. This capability is supplied by the jack arrangement the larger CTs as shown in FIGS. 4–6.

The outer periphery of the skid plate is provided with a stop ring 27 which is secured to the skid plate to prevent the jack base from sliding off the edge of the skid plate. Also mounted on top of the skid plate and encircling the jack is a trip ring 29 which is slidably disposed on the skid plate. Connected to the trip ring is a mechanical actuation arm 31 which is connected to a double action limit switch 33. Movement of the jack on the skid plate and against the trip ring will move the trip ring and its actuation arm and thereby activate limit switch contacts for a warning system indicating which direction the jack has moved off center. After the jack is recentered on the skid plate, the trip ring can be repositioned so that the contacts are reset in a deactivated status.

The double action limit switch 33 interconnected with the trip ring actuation arm responds to the trip ring being moved in any direction of excessive movement by the lift jack: fore and aft or to one side or the other. If just one direction of excessive movement occurs, such as forward or aft, only the first action of the limit switch is activated to indicate the movement. If the load also moves excessively to one side or the other, that movement is also indicated by the second action of the limit switch being activated.

THE RAM GUIDES MOVEMENT RESTRAINTS

The smaller CTs of the 400 ST capacity, and which are also disposed diagonally from each other, are provided with platforms 35 comprised of a 1½ inch thick steel plate with a ½ inch thick rectangular stainless steel skid plate for supporting the other pair of hydraulic lift jacks.

A means is provided for adjustable force resistance to prevent movement of the other two of the lift jacks on their skid plates except in predetermined directions of movement. This is done by ram guide movement restraints 37 which include side shift rams. One set of restraints permits reciprocal linear movement of its lift jack in a direction preferably parallel to the direction of the movement of the load and the other set of guides permits reciprocal linear movement of the load perpendicular to the direction of movement permitted by the first set of guides. The prime purpose of the movement restraints, ram guides, or side shift rams is to restrain the actual movement of the jacks on the CTs in their guides until the lateral side loading exerted on the lift jacks exceeds a preselected force.

Reference is made to FIGS. 7–9 the drawings for an understanding of the side shift assemblies or the ram guide movement reatraints. The two mechanisms are identical on each of the respective CTs except for the fact that they are disposed at 90° with respect to each other in operative position. The rams 39 are double ended of hydraulic industry standard JIC design and rated at 30 tons each. Double ended means they can be moved in either direction by hydraulic pressure. The rams are arranged to act in pairs to produce a maximum of 60 tons restraint on each jack at 3000 psi maximum pressure.

The rams are disposed parallel to each other and horizontal to the skid plate and are secured approximately midlength to the hydraulic jacks. In order to position the hydraulic rams at midheight location above the skid plates, a ram supporting cradle is required in the form of a generally rectangular frame which is supported above the skid plate mounted on the CT by elevating support brackets 41. It is comprised of a pair of parallel guide bars 43 which are secured to the skid plate by bolts on opposite sides of the lift jack and define the path of travel of the lift jack on the skid plate. The lower ends of the support brackets 41 are secured to the guide bars and extend upward and outward therefrom. A pair of parallel tubular members 45 are mounted at the upper ends of the support brackets parallel to the skid plate. A pair of tie bar end plates 47 are mounted to the ends of the tubular members interlocking the tubular members to create the mounting points for the ends of the hydraulic rams.

A pair of ram tie rods 49 are secured parallel to each other between the tie bar end plates of the movement restraints. These tie rods are surrounded by the hydraulic cylinders of the rams 39 which can move in either direction along the tie rods. A double acting piston is located in the center of the tie rods inside the tubular hydraulic cylinder whereby as hydraulic pressure is applied to one side or other of the piston secured to the tie rod, the cylinder moves in the direction of the side to which the hydraulic pressure is applied thereby moving the cylinder along the rod. The two cylinders are secured to the sides of the lift jack which is disposed between the cylinders so that the lift jack can be moved back and forth along the linear direction of travel between the guide bars 43 depending upon which side of the piston hydraulic pressure is applied.

The left shift rams 39 of the preferred embodiment of the present invention have a 6 inch bore with a stroke of plus or minus 24 inches and a displacement of 4.4 gal.

The rams react against any side load force caused by the load which tends to slide the jack in its guide: the rams restrain the movement of the jack on the skid plate. The rams effect this restraint until the side load reaches a value equal to the latent frictional resistence of the jack on the skid plate plus the ram resistance. When these combined forces are overcome, that of the frictional resistance and the dual ram restraint, the jack will slide on the skid plate in the linear direction permitted by the guides and prevent an overload being imposed upon the lifting brackets which are secured to the load or to the load itself if lifting brackets are not used.

The side shift rams effect this restraint by simply having the valves which supply hydraulic fluid to both sides of the double acting piston in the ram closed. An adjustable pressure relief valve 51 is disposed between the cylinder pressure supply which can be set at a preselected pressure and thus hold the hydraulic cylinders at their position on the tie rods unless the force exerted on the cylinder in one of the directions of travel that the jack is permitted to move overcomes the pressure set in the relief valve and permits the hydraulic fluid to flow from one end of the cylinder to the other and thereby permits the cylinder to move along the tie rod.

It would seem possible that the movement restraints would not necessarily need to be arranged to permit movement of the load in the guides only in directions parallel and normal to the directions of movement of the load over the ground nor that the restraining guides need to be disposed at diagonal corner locations on the load, but these selections were deemed preferable for balance and positive load control in any direction of travel.

In operative position, the side shift rams 39 on the two CTs are arranged to permit reciprocal linear motion of the hydraulic jacks within the ram guides or movement restraints 37 in directions which are disposed perpendicular to each other. Thus, one movement restraint controls the direction of movement of the load to be transported in a first direction of motion, such as fore and aft, and the other side shift ram on the other CT, disposed at the diagonal corner position from the first CT, controls the movement of the load on the CTs in a second direction of motion perpendicular to the first direction, such as side to side.

The effect that each ram guide 37 has on the load is to impart a unidirectional component of motion to the load by the movement of the CT having a ram guide mounted thereon. The component of motion imparted to the load is in a direction perpendicular to the direction of reciprocal linear motion permitted by the ram guide. The combined effect of the two CTs having the ram guides mounted thereon is to impart positive controlled movement to the load in any desired direction. The basic function of the two other CTs is simply to support the other two corners of the load during movement, but in reality the frictional interconnection of the load to those CTs also permits them to impart motion to the load.

If a lift jack has shifted on the skid plate due to excessive side load, the side shift rams 39 can be used to return the lift jacks 23 back to the centered position. To effect movement of the lift jack on the skid plate, the pressure relief valve 51 settings are increased to the maximum and then the load is moved by pumping fluid into the jacks until the latent friction or resistance of the jacks on the skid plate is overcome to move them. The jacks are moved until they are centered and the procedure is stopped. The the pressure relief valve 51 settings are then lowered to the former override pressure settings which will permit the movement of the jack on the skid plate by excessive side load.

THE LIFT JACKS

The lift jacks 23 of the present invention for lifting the load are double acting jacks which means they can be either raised or lowered by application of hydraulic pressure to the top or bottom of the piston. They are rated at 318 tons on the piston end at 3,000 psi with a maximum stroke of 14 inches. The jacks are designed to take a 112 kip side load from any direction with the jack ram extended 12 inches and when supporting 300 tons with a safety factor of 3 to 1 based on the yield point of the material from which the jacks are made. Anti-friction woven teflon bearing pads are secured to the bottom of each jack base to facilitate horizontal movement of the jack base on the stainless steel skid plates which are secured to the CT decks.

In the actual embodiment of the present invention, four lifting brackets were bolted to the bottom corners of the object to accommodate the irregular configuration. Each lifting jack has a swivel head plate 53 on its ram which was bolted to the lifting bracket. The jacks could be secured directly to the object without brackets, but it is important that the connection of the jacks to the object be rigid enough to control the horizontal movement of the object with respect to the CTs. It is possible that the system could be inverted with the skid plates secured to the object and the jacks secured to the CTs, however that embodiment will not be further considered other than to say it would be obvious to one skilled in the art to make the inversion based upon the teachings of the present disclosure.

THE HYDRAULIC SYSTEM

For purposes of lifting the load, the jacks of the crawler transporters on the same side, preferably front and rear initially, are interconnected or mated and the jacks of the other CTs on the opposite side are likewise interconnected.

The hydraulics for the apparatus of the present invention are divided into two identical independent systems, one of which is shown in the hydraulic schematic of FIG. 10. Each independent system controls two of the four lift jacks and a set of side shift rams. The two hydraulic lift jacks on the same side of the load are interconnected or mated with all hydraulic controls mounted on the CT carrying the circular skid plate for the free floating jack. The hydraulic lines run from the control panel to the jack on the other CT. The same system is used for the similarly paired jacks which are disposed on the opposite side of the load.

FIG. 11 shows the control panel for one of the independent hydraulic systems which is divided into two parts: the jacking system which controls two lift jacks and the side shift system which controls the rams. The master selector when set in the neutral position blocks the pump pressure from pressurizing either the jacking or the side shift systems. With the master selector in the jacking system position, the side shift system is blocked from pump pressure and vice versa.

The hydraulic schematic of FIG. 10 shows a dual port hydraulic pump 55 connected to a set of pressure relief valves 57 which return bypassed fluid to the reservoir 59. Hydraulic fluid is drawn out of the reservoir through a suction strainer 61 and is routed to the pump through a shut off valve 63 and hydraulic hose 65. Fluid is also returned to the reservoir from the system through a filter 67. The reservoir is also provided with a fluid heater 69, filler/breather 71, sight gauge 73, and magnetic drain 75.

The hydraulic pump for supplying pressure to the jacks and to the side shift rams is driven by a V belt coupling off of the fan pulley on the front of the CT's diesel engine. The pump is a 5000 psi six piston heavy duty axial pump. The pistons are in groups of three: each group independently ported with a check valve in each port to prevent backflow. Hydraulic fluid driven by the pump goes through the 4 way selector valves 77 to either the side shift system 4 way valve 79 or the lift system 4 way valves 81.

In the master selector in the jacking mode, the pump 55 discharges from two ports into two different systems which are considered separate systems called A and B, but both operate from the same pump. In each system there are two lift jacks 23 and one horizontal side shift system. With the master selector switched to jacking system and the common valve selector lever of the jacking system in the off position, independent pressure is supplied from the dual system piston pump to each of the systems A and B in the jacking system: one port of the pump discharges to one lift jack and the other port discharges to the other jack. Either of the lift jack control handles 83 can raise or lower or hold its jack independently of the other control handle. The gauges on the control panel show the pressure readings of the piston end pressure on its respective hydraulic jack. Since the pump pistons are driven by a common shaft, and if the hose lengths are made identical, and the jack loads are equal, both systems discharge equal volumes to both jacks (within the limit of the pressure relief valve pressure settings). Both jacks will raise equally in the same time with both control valve handles in the raised position.

With the master selector in the jacking mode and the common valve control handle switched to the on position, the hydraulics are interconnected between two lift jacks and the pressure is equalized. Either or both of the raise or lower control handles 83 can then be used simultaneously or individually to raise or lower the load. The difference being that the speed of raising or lowering is halved when using only one of the two control handles to effect the desired motion.

The hydraulic lines of the jacking system, after directing the fluid through the lift valves 81, direct the fluid to the common valve 85 and then through the flow control check valves 87 to the lift jacks through the quick disconnect couplings 89.

The side shift mechanism portion of the control panel is used only to actuate the rams to recenter the jacks in their guides on the CTs which carry the movement restraint mechanisms. When the ram end ports are commoned by switching the float valve 89 on, there is no movement restraint on the lift jack. The hydraulic fluid can flow from one end of the cylinder to the other around the intermediate double faced piston thereby causing no resistance to movement of the cylinder on the tie rod. The degree of restraint can be controlled by switching the float valve to off and adjusting the dual pressure relief valve 91 interposed in the hydraulic system between the ports at the ends of the rams.

During transportation of the load, the float valve 89 is in the off position. This holds pressure in the ram side shift system. The dual relief valve 91 for the side shift rams are present at a preselected pressure to allow flow between the rod ends if an over side load occurs and prevent an accidential overload to the load supporting brackets. This setting is based on a nominal coefficient of friction of 0.04 between the jack base bearings and the stainless steel skid plate on the CT deck with a rated 300 ton load on the jack. If the jack must be side shifted on either CT while the jack is loaded, the pressure relief setting on the dual relief valve 91 is increased sufficiently to permit the side shift mechanism to be actuated by pump pressure and to move the jack after which the dual relief valve pressure is returned to the preselected setting.

Shifting of the load by the side shift mechanism is accomplished by placing the master selector valve in the side shift system position. The float control handle is set in the off position and the control lever 93 is moved in the desired position of left or right to recenter the load as required. The pump then forces hydraulic fluid into the rams to effect the side shifting by moving the cylinders and the attached jack. Depending upon which way the side shift ram control valve is disposed, left or right, fluid can be pumped to the same ends of the pair of rams to move the lifting jack in either direction. If the side shift valve is centered to the close or "hold" position, excessive side loading of the rams in the direction of travel of the jack permitted by the ram guides will cause fluid to flow from the same respective ends of the rams through the pressure relief valves to the other ends of the rams through the dual pressure relief valve 91.

THE WARNING SYSTEM

In a preferred embodiment of the invention, each of the CT operator stations is equipped with a display panel (FIG. 12) and buzzer warning system for indicating excessive movements of any of the lift jacks with respect to their mounts on the CTs. The display panel of the preferred embodiment provides information to the operator of each CT with respect to all of the jacks on each of the CTs concerning horizontal location on skid plates and vertical operating range. The system indicates by lights and sounds when any hydraulic lift jack:

1. is above or below its normal working range of 3 to 12 inches of rod extension (the total jack range being 0 to 14 inches).

2. free to float in any horizontal direction has moved radially off its normal working range of 0 to 20 inches from its operating center (the maximum radial operating range is 24 inches from center).

3. mounted within ram guides has moved off its center of operation in either direction within its restraints more than its normal working range of 0 inches to 18 inches (the maximum range is 24 inches off center).

If any motion of the jacks on the four CTs exceeds its normal working range, limit switches are activated and a buzzer will sound on all CTs and the indicator light for the motion of the jack at fault will appear within the light display on the display panels on all CTs. At the sound of the buzzer, all CT operators immediately reduce throttle to zero stopping movement of the load. The move leader then can take corrective action by giving directions to effect individual movement of a particular CT to recenter the load. The alarm buzzer can be silenced by correcting the over travel or by pushing the silence button on the CT where the over travel has occurred.

METHOD OF MOVING THE OBJECT

The present invention involves both the method as wells as the apparatus for transporting a large object. In order to move the object, it is necessary to select four spaced apart lift points on the bottom of the object which are relatively equal level and are spaced apart in a generally rectangular configuration. A crawler transporter is positioned under each lift point and provided with a lift jack for lifting the object at the lift point. The lift jacks are secured to the lift points.

The lift jacks of the system are divided into two pairs and the hydraulic systems of the jacks are of dual capability whereby two lift jacks can be interconnected to equalize the hydraulic pressure between them or they can be operated independently. When two lift jacks are made interdependent, they effectively operate as a single lift point disposed on a line between them. Likewise the hydraulic systems of the other two lift jacks are interconnected so that there are two pairs of interconnected lift jacks in which the lift jacks of each system are interdependent when the hydraulic systems are interconnected.

In the preferred embodiment, the hydraulic lift systems are comprised of two adjacent hydraulic lift jacks, one a free floating jack and the other a restrained movement jack, which are interconnected. It is possible that the two free floating jacks could comprise one system and the two lift jacks restrained between guides could be a second system, but they would require completely different hydraulic and control systems. The preferred embodiment permits two identical but separate control systems because there is one of each type of jack and side shift mechanism in the same system. This feature creates savings in design, construction, maintenance, and training of the operators, and it promotes safety in operation by having only one type of control system for the operators to master and the supervisors to monitor.

A means is provided for controlling the directional movement of the object and this is the pair of ram guide movement restraints which are connected to at least two of the lift jacks and operate to control movement of one of the lift means in a first direction of movement perpendicular to the second direction of controlled movement of the other lift means. This in effect restrains movement of the object in all directions relative to the effective center of the four transporters when they are supporting the object. In the preferred embodiment, the ram guide movement restraints are engaged with diagonally disposed lift jacks.

LIFTING THE OBJECT

Lifting the object is accomplished by first lifting it clear of its supports and then lifting one side of it by two of the adjacent interconnected lift jacks with the hydraulic system commoned to permit the jacks to float and equalize. The load is raised until the two lift jacks are both extended to a position proximate the middle of their operating range then the other side of the load is similarly lifted.

This lifting is preferably done in several steps. First, the hoses are interconnected between the CTs and the two pairs of lift jacks with each pair including one of the free floating lift jacks and one of the restrained lift jacks. The electric connections are interconnected for all of the display panels on all of the CTs. The master selectors on both control panels controlling the two systems are placed in the jacking system mode. The common controls in the jacking system portion are placed in the "on" position to equalize pressure in the pairs of jacks. Then the jacks are raised to establish contact with the load at the lift points. Next the Systems A and B control handles of the jacking system are placed in the raise mode and the pressure in the systems of the lift jacks are raised to a prelift pressure so that the jacks are preloaded and equalized to about 60 percent of the pressure required to actually lift the load.

The jacking common controls are then placed in the off position and all of the jacks are raised simultaneously until the load clears its supports. The jack valves are then moved to hold to maintain the load just clear of the supports. Then the common valve control handle of one of the pair of independent jacking systems having two lift jacks is placed into the "on" position to equalize the pressure between the jacks. These jacks are then raised to lift one side of the load to the middle of the jacks' operating range and the jack valves are then placed into the hold position and the common valve moved to off. Next, the other jacking system for the other two jacks is operated in the same manner as the first system to lift the other side of the load. When the load is being supported at a position midway in the operating range of the four lift jacks, all of the lifting controls are moved to hold and the common controls moved to off so the jacks are blocked against floating. Gravity holds the load firmly against the jacks, and in turn the CTs, thereby preventing tortional rotation of the load around any horizontal axis.

To move the load, the common valve in one of the two separate jacking systems is placed in the "on" position to permit free floating of two of the jacks. If, due to variations in the ground elevations between the four CTs during transport, the load rotates about its horizontal axis disposed perpendicular to the line drawn between the two independent jacks that are not commoned, the lift jacks in the commoned system are free to flow up and down simultaneously in opposite directions to act as a single point of support between the two CTs to accommodate the rotation. The load is moved with an effective three point suspension supporting the load above the CTs to prevent racking or twisting of the structure. Transporting the load is effected by operating each of the CTs simultaneously in a coordinated manner.

It is possible that both hydraulic systems could be made free floating during a move because of the inherent capability of the design, but this could be done only with a very uniform load. Otherwise, a heavier side of the load would sag and two of the jacks might bottom out. Thus, three point support is the preferable mode of operating the method.

STRAIGHT LINE MOVEMENT

Straight movement of the load is accomplished by observance of the following perameters. All CTs are positioned axially on their respective transporting paths and each jack is accurately centered on its respective CT. All CTs then initially power first one of its tracks and then the other sufficiently to take all slack out of the drive chains and drive system in the direction of travel.

A superintendent in radio communication with each of the drivers of the CTs then coordinates the move by directing all of the CT drivers to act in unison. The CTs are placed in low gear and the brakes are released and all of the CT throttles are advanced simultaneously to the optimum maximum of 1,200 rpm. Simultaneous movement of all of the CTs occurs between 1,000 and 1,100 rpm when transporting the very large loads without any wind loading. The travel speed in first gear at 1,200 rpm is approximately 25 feet per minute. This has been found to be a comfortable speed and allows for adequate response in the case of required corrections or emergencies.

A track is laid out for each CT and a guide prick approximately 15 feet long extends from the front of the CT. The guide prick extension is located on the axis of travel of the CT forward of the machine. A chain is suspended from the end of the guide prick to ground level which permits the operators on the CTs to keep in line by keeping the chain tracking on the path layed out in the direction of travel. When a CT angulates its heading, the guide prick acts as a sensitive indicator showing that the CT is off track.

Each operator must make minor direction corrections to keep his CT on its line of travel, and this is done by briefly disengaging the drive clutch on the track that must be retarded and allowing the other track to catch up and keep the CT moving. The time of disengagement of a track to make the minor corrections necessary has been found to be sufficiently brief to prevent the air brake from setting on the tracks. This prevents an abrupt and undesirable change in direction. Skill of course, is required of the operators to avoid over correction due to a slack developing in the drive chains on the disengaged track of the CT. Re-engagement of the disengaged track is required prior to the guide prick reaching the tracking line to prevent over corection. The slack removal in the chain on the drive track that was disengaged causes the final directional correction.

In the case of a ruptured hydraulic line, or any other reason for loss of pressure in the lift jacks, a fixed orifice in the jacks restricts the hydraulic fluid discharge flow thereby controlling the rate of descent of the load. A load is not transported unless the jacks are supporting it on hydraulic fluid which means the jacks are above the lower minimum extent of rod extension. The swivel heads on the tops of the jacks accomodate rotation of the CTs about their horizontal axes. The load should not be transported unless the commoning valve in one of the two jacking systems is in the "on" position permitting the two jacks in that system to float. With the system commoned, the load distributed between the four corners is equalized preventing vertical overloads in the jacks and the CTs and thereby preventing racking of the load during transport since the three point suspension creates a geometric plane in which the three points of suspension remain at all times.

In the event the automatic warning system indicates that a lift jack has moved out of its preselected range of operation, the movement of the object is stopped. This is accomplished by all of the CT operators simultaneously reducing throttle setting to idle and allowing rolling resistance to bring the CTs to a smooth stop. The CT brakes are never set during a straightway transport to stop a CT. Then the crawler transporter which is associated with that lift means that has triggered the warning must first be operated in a manner to restore the lift means to proximate the center of its preselected range of operation. Next the CT must be operated in a manner to re-aim it so that it corresponds in heading with the rest of the CTs. Then the load can be further transported by operating each of the CTs simultaneously in a coordinated manner as before.

TURNING DIRECTION OF MOVEMENT

Turning of the load when it is supported by the apparatus of the present invention requires coordination among the CTs the same as straight ahead movement. While many methods of effecting turns may be utilized, an effective one has been determined. Prior to making a turn, the load is lowered to the lower end of the operating range of the lift jacks for purposes of stability. After the turn is completed, the load is raised back to the transporting operating range. Lowering of the load may not be necessary except as a safety precaution. To facilitate turning, large pivot turntables are placed under the tracks of the CTs on the inside of the turn underneath the tracks that stay stationary so that the outside tracks of the CTs pivot around the fixed tracks which are on the turntables. This arrangement permits the CT to rotate more freely and the inside track to remain more accurately in place during the turn and effects more accurate turning control of all the CTs. It eliminates the time and difficulty in making individual corrections to the CTs during turning and helps keep the jacks within their range of horizontal float on the respective skid plates.

To make the turn, the CTs are advanced in unison until the CT inside tracks are centered on the turntables. The pivot tracks of the CTs which are on the turntables are reversed on all CTs removing all chain slack and tensioning the drive chains. The inside track brakes are locked. In the same manner, all of the drive tracks are powered in the direction of turn removing all slack.

A protractor line is laid out under the guide prick chains to help the operators make the turn. The protractor is divided into ten degree increments so that the chain hanging from the guide prick can be stopped on each one of the ten degree marks.

At the direction of the superintendent controlling the move, all of the CT operators advance throttle until simultaneous turning of all of the C.T. occurs. Each operator reduces his throttle to idle as the guide prick reaches the first ten degree increment mark. This procedure is followed for each ten degree increment of turn until the desired angle of turn has been completed by all the C.T.s.

Exiting from the turn point is accomplished in a manner similar to entry with all the drive chains being tensioned in the travel direction and then the throttles advanced simultaneously upon command and the movement of the load in a straight ahead direction continued.

At the end of the move, the load can best be deposited on its supports by reversing the procedure of lifting the load.

The advantages of the present invention are that it can lift, move, and turn very large loads in excess of 1,000 tons or more over uneven ground without racking the load.

It will be seen from the foregoing description of the preferred embodiment of the invention that all of the objects attributable thereto can be achieved. While the invention has been described in considerable detail, it is not to be limited to such detail except as may be necessitated by the appended claims.

I claim:

1. Apparatus for moving a large object comprising four crawler transporters,
   hydraulic lift means mounted on the top of each transporter and secured to the object,
   a horizontal sliding mount disposed on top of each of the transporters to permit the lower ends of each of the hydraulic lift means to move with respect to its transporter, two of said lift means being free to move in any direction when subjected to side loading which exceeds the frictional engagement of the lift means with the mount,
   a pair of movement restraints disposed on the top of the sliding mounts of the other two of the transporters and formed to restrain movement of the object in all directions relative to the effective center of the four transporters when they are supporting the object, and
   a hydraulic interconnection between at least two of the lift means to permit both to float interdependently under load.

2. The apparatus of claim 1 including means associated with each of the lift means for indicating excessive movement of any of the lift means with respect to its mount on its transporter.

3. The apparatus of claim 1 including means for effecting controlled movement of either of the lift jacks disposed in the movement restraints in either direction of travel permitted by the movement restraints.

4. Apparatus for moving a large object comprising four crawler transporters
   hydraulic lift jacks mounted on top of each transporter and secured to the object,
   a first hydraulic system for interconnecting two hydraulic lift jacks and a second separate hydraulic system for interconnecting the other two lift jacks so there can be two pairs of two hydraulically interconnected and interdependent lift jacks or two or four independent lift jacks,
   a horizontal sliding mount disposed on the top of each transporter to permit the lower ends of the hydraulic jacks to move with respect to its transporter, two of said jacks being free to move in any direction when subjected to side loading which exceeds the frictional engagement of the jack with the mount,
   first and second movement restraints engaged with the other two lift jacks which restrain movement of one of the lift jacks to a first direction of reciprocal linear travel on its mount and movement of the other lift jack to a second direction of reciprocal linear travel perpendicular to the first direction of travel,
   means for controlling the resistance to movement of the lift jacks in the movement restraints in either direction of reciprocal linear movement until the lateral side loading in a direction of permitted motion on either of the lift jacks exceeds a preselected force, and
   means for effecting controlled movement of either of the lift jacks disposed in the movement restraints in either direction of travel permitted by the movement restraints.

5. The apparatus of claim 4 including means associated with each of the lifting jacks for indicating excessive movement of any of the lift jacks with respect to its mount on its transporter.

6. The apparatus of claim 4 wherein each of the first and second separate hydraulic systems interconnecting the pairs of two hydraulic lift jacks include
   pump means for operating each hydraulic jack independently of the other, and
   means for interconnecting the pump means for interdependent operation of two adjacent lift jacks on the same side of the load.

7. The apparatus of claim 6 wherein the first and second separate hydraulic systems are identical and each include a free floating lift jack and a lift jack engaged with a movement restraint, said systems also including hydraulic rams for moving the lift jacks disposed in the movement restraints in either direction of permitted resiprocal linear motion.

8. The apparatus of claim 4 wherein the movement restraints include,
   hydraulic rams engaged with the lift jacks which are arranged either to prevent linear movement of the lift jacks in the movement restraints unless a preselected side loading in either direction of linear travel permitted by the movement restraints is exceeded or to move the lift jacks within the movement restraints in the directions of permitted motion.

9. The apparatus of claim 4 wherein the means for indicating excessive movement of the lift jacks on their mounts include electrical limit switches which are activated by the lift jacks, the limit switches associated with the free floating lift jacks actuated by a ring member disposed on the jack mount and surrounding the lift jack whereby movement of the ring member by a lift jack activates a dual action limit switch, and movement of a lift jack to either end of a movement restraint activates a limit switch.

10. Apparatus for moving a large object comprising four crawler transporters
    hydraulic lift jacks mounted on top of each transporter and secured to the object,
    a horizontal sliding mount disposed on the top of each transporter to permit the lower ends of the hydraulic jacks to move with respect to said transporter, two of said jacks being free to move in any direction when subjected to side loading which exceeds the frictional engagement of the jack with the mount,
    first and second movement restraints engaged with the other two lift jacks which restrain movement of one of the lift jacks to a first direction of reciprocal linear travel on its mount and movement of the other lift jack to a second direction of reciprocal linear travel perpendicular to the first direction of travel, hydraulic rams arranged as part of the movement restraints and engaged with the lift jacks either to prevent linear movement of the lift jacks in the movement restraints unless a preselected side loading in either direction of linear travel permitted by the movement restraints is exceeded or to move the lift jacks within the movement restraints in the direction of permitted linear motion, a pair of identical hydraulic systems, each of said systems arranged for interconnecting two lift jacks disposed on the same side of the object for interdependent operation, said systems each including one free floating jack and one jack engaged with a movement restraint, said systems also including pump means for operating each jack independently of the other and means for interconnecting the jacks for interdependent operation, and said systems also including means for contolling the resistence of the rams to movement of the jacks in the movement restraints and for effecting controlled movement of the lift jacks disposed in the movement restraints in either direction of travel permitted by the movement restraints, and means for indicating excessive movement of the lift jacks on their mounts including electrical limit switches which are activated by the lift jacks, the limit switches associated with the free floating lift jacks actuated by a ring member disposed on the jack mount and surrounding the lift jack whereby movement of the ring member by a lift jack activates a dual action limit switch, and movement of a lift jack to either end of a movement restraint activates a limit switch.

11. A method for transporting a large object comprising, selecting four spaced apart lift points on the bottom of the object, positioning a crawler transporter under each lift point, providing hydraulic lift means on each transporter for lifting said object at each of said lift points, lifting the object by the lift means on said transporters, interconnecting the hydraulic system of two adjacent hydraulic lift means whereby the two lift means are commoned to equalize the hydraulic pressure between the two and the lift means are interdependent and effectively operate as a single lift point disposed between the two lift means, providing means for controlling the directional movement of the object, and transporting said object by operating each of said transporters simultaneously in a coordinated manner while the four lift means support the object with an effective three point suspension.

12. The method of claim 11 wherein one end of each of the hydraulic lift means are secured to the object and sliding mounts are provided on the crawler transporters to permit independent movement of the transporter relative to the object.

13. The method of claim 11 wherein the means for controlling the directional movement of the object includes providing adjustable force movement restraints on at least a portion of the lift means for having the effect of restraining movement of the object in all directions relative to the effective center of the four transporters unless the resistance to movement by the object exceeds the preselected force of the adjustable force movement restraints and causes the respective lift means to move within its movement restraints.

14. A method for moving a large object comprising selecting four lift points on the bottom of the object in a generally rectangular configuration, positioning a crawler transporter under each lift point, providing hydraulic lift means on each transporter for lifting said object at each of said lift points, securing the hydraulic lift means to the lift points on the object, providing sliding mounts on the transporters to permit independent movement of the transport relative to the object, lifting the object by the lift means on said transporters, interconnecting the hydraulic system of two adjacent hydraulic lift means so that the lift means are interdependent and act as a single lift point disposed between the two lift points, providing adjustable force movement restraints on at least a portion of the lift means for having the effect of restraining movement of the object in all directions relative to the effective center of the four transporters unless the resistance to movement by the object exceeds the preselected force of the adjustable force movement restraints and causes the respective lift means to move within its movement restraints, providing means for moving the jacks in the movement restraints in the permitted directions of travel, and transporting said object by operating each of said transporters simultaneously in a coordinated manner while the four lift means support the object with an effective three point suspension.

15. The method of claim 14 wherein a second hydraulic system is provided for the remaining pair of lift means so that there are two pairs of interconnected lift means in which the lift means of each system are interdependent and can act as a single lift point disposed between the two lift points or the lift means can be operated independently, lifting one side of the object by two of the adjacent lift means with the hydraulic systems interconnected until the two lift means are both extended to a position proximate the middle of their operating range, disconnecting the hydraulic system interconnecting the two lift means which first lifted one side of the load, interconnecting the hydraulic system of the other two lift means, lifting the other side of the object in the same manner as the first side was lifted, and transporting said object by operating each of said transporters simultaneously in a coordinated manner while the four lift means support the object with one of the hydraulic system interconnecting two of the lift means.

16. The method of claim 14 wherein a pair of movement restraints are provided on two of the lift means and which are arranged to restrain movement on the two lift means in directions which are perpendicular to each other.

17. The method of claim 14 including providing an automatic warning system to indicate when any of the lift means has moved out of a preselected range of operation on its mount, stopping the movement of the object when the automatic warning system indicates a lift means has moved out of its preselected range of operation, operating the transporter associated with the lift means which has moved out of its preselected range of operation in a manner to restore the lift means to its preselected range of operation, operating the same transporter to correspond in heading with the rest of the transporters, and transporting the object by operating each of the transporters simultaneously in a coordinated manner as before.

18. The method of claim 14 including the steps of interconnecting the lift means of both systems prior to lifting the object, and prepressurizing both hydraulic systems without lifting the object.

19. The method of claim 14 wherein turning the direction of travel of the object is accomplished by placing a turntable under one of the corresponding tracks on each of the crawler transporters, locking the tracks on each of the transporters which are disposed on the turntables, simultaneously rotating the transporters about the turntables to the desired degree of turn, and transporting the object in the new direction of travel.

20. The method of claim 19 including the steps of truning the transporters in coordinated equal increments until the new direction of travel is achieved.

21. A method for moving a large object comprising selecting four relatively equal level lift points on the bottom of the object spaced apart in a generally rectangular configuration, positioning a crawler transporter under each lift point, providing hydraulic lift jacks on each transporter for lifting said object at each of said lift points, securing the hydraulic lift jacks to the lift points on the object, providing a sliding mount for the lower end of the lift jacks on each transporter, providing a first hydraulic system for interconnecting two of the adjacent hydraulic lift jacks and a second system for interconnecting the other two lift jacks so that there are two pairs of interconnected lift jacks in which the lift jacks of each system are interdependent when the hydraulic systems are interconnected or independent when the systems are not interconnected, providing first and second adjustable force movement restraints on two of the lift jacks which restrain movement of one of the lift jacks to a first linear direction of reciprocal travel on its mount on its transporter and movement of the other lift jack to a second linear direction of reciprocal travel perpendicular to said first direction of travel, said movement of either lift jack occurring only when the side loading on one of the lift jacks exceeds a preselected force, controlling the movement of the lift jacks disposed in the movement restraints by adjusting the amount of resistance the movement restraints can exert against the lateral force exerted on the lift jack by the object before the lift jack overcomes the resistance and slides in the linear direction of travel permitted by the movement restraint, providing means for moving the jacks in the movement restraints in the permitted directions of travel, providing an automatic warning system to indicate when any of the lift jacks has moved out of a preselected range of operation on its mount, interconnecting the lift jacks in the two hydraulic systems, prepressurizing both hydraulic systems without lifting the object, lifting one side of the object by two adjacent lift jacks with their hydraulic systems interconnected until the two lift jacks are both extended to a position proximate the middle of their operating range, disconnecting the hydraulic interconnection between the two lift jacks which first lifted one side of the object, lifting the other side of the object in the same manner as the first side was lifted, transporting said object by operating each of said transporters simultaneously in a coordinated manner with one of the two hydraulic lift systems disconnected so that the two lift jacks of that system operate independently and the other system interconnecting the other two jacks so that the four lift jacks support the object with an effective three point suspension, stopping the movement of the object when the automatic warning system indicates a lift means has moved out of its preselected range of operation operating the transporter associated with the lift means which has moved out of its preselected range of operation in a manner to restore the lift means to its preselected range of operation, operating the same transporter to correspond in heading with the rest of the transporters, transporting the object by operating each of the transporters simultaneously in a coordinated manner as before, turning the direction travel of the object by placing a turntable under one of the corresponding tracks on each of the crawler transporters, locking the tracks on each of the transporters which are disposed on the turntables, turning the transporter in coordinated equal increments until the new direction of travel is achieved.

* * * * *

UNITED STATES PATENT AND TRADEMARK OFFICE
CERTIFICATE OF CORRECTION

PATENT NO. : 4,222,581
DATED : September 16, 1980
INVENTOR(S) : Walter L. Treadwell and Kenneth F. Dewing It is certified that error appears in the above—identified patent and that said Letters Patent is hereby corrected as shown below:

Column 2, line 4, "means," should be --means.--

Column 4, line 47, "reatraints" should be --restraints--

Column 5, line 24, "left" should be --side--

Column 9, line 28, "wells" should be --well--

Column 11, line 55, "corection" should be --correction--

Column 14, line 32, "resiprocal" should be --reciprocal--

Column 17, line 31, "truning" should be --turning--

Signed and Sealed this

Second Day of June 1981

[SEAL]

Attest:

RENE D. TEGTMEYER

Attesting Officer

Acting Commissioner of Patents and Trademarks